United States Patent [19]
Warby

[11] Patent Number: 6,089,256
[45] Date of Patent: Jul. 18, 2000

[54] METERING VALVES FOR PRESSURIZED DISPENSING CONTAINERS

[75] Inventor: Richard John Warby, Wisbech, United Kingdom

[73] Assignee: Bespak plc., United Kingdom

[21] Appl. No.: 09/357,936

[22] Filed: Jul. 21, 1999

Related U.S. Application Data

[63] Continuation of application No. 09/108,303, Jul. 1, 1998, abandoned.

[30] Foreign Application Priority Data

Sep. 3, 1997 [GB] United Kingdom .................... 9718693
Oct. 13, 1997 [GB] United Kingdom .................... 9721684

[51] Int. Cl.[7] ................................................. F16K 31/00
[52] U.S. Cl. .......................... 137/375; 251/353; 251/354; 251/368
[58] Field of Search .................................. 251/353, 354, 251/368; 137/375; 222/402.24

[56] References Cited

U.S. PATENT DOCUMENTS

| | | | |
|---|---|---|---|
| 3,278,088 | 10/1966 | Clouzeau et al. ........................ | 251/353 |
| 3,313,459 | 4/1967 | Mizguchi ................................ | 251/353 |
| 4,405,178 | 9/1983 | Brandenburg ........................... | 251/353 |

FOREIGN PATENT DOCUMENTS

| | | |
|---|---|---|
| 45 551 | 8/1986 | Austria . |
| 689 28 465 T2 | of 0000 | Germany . |
| 41 31 436 A1 | 3/1993 | Germany . |
| 195 04 502 A1 | 8/1996 | Germany . |
| 2206100 | 12/1988 | United Kingdom . |
| 2 216 872 | 10/1989 | United Kingdom . |
| WO 88/07010 | 9/1988 | WIPO . |
| WO 95/30607 | 11/1995 | WIPO . |
| WO 96/25138 | 8/1996 | WIPO . |

*Primary Examiner*—A. Michael Chambers
*Attorney, Agent, or Firm*—Smith, Gambrell & Russell, LLP

[57] ABSTRACT

This invention relates to metering valves for pressurised dispensing containers.

The present invention provides a metering valve for use with a pressurised dispensing container. The valve comprises a valve stem (1) co-axially slidable within a valve member (2) defining an annular metering chamber (13). Outer and inner annular seals (4, 5) are operative between the respective outer and inner ends of the valve member (2) and the valve stem (1) to seal the annular metering chamber (13) therebetween. Wherein the valve member (2) comprises a main component part (17) and a liner (16) lining at least a portion of an inner surface of the main component part (17). The liner (16) is a fluoropolymer, and the main component part (17) is made of another material.

7 Claims, 2 Drawing Sheets

METERING VALVES FOR PRESSURIZED DISPENSING CONTAINERS

This is a continuation of U.S. patent application Ser. No. 09/108,303 filed Jul. 1, 1998 now abandoned.

This invention relates to metering valves for pressurised dispensing containers.

Conventional metering valves for use with pressurised dispensing containers comprise a valve stem coaxially slidable within a valve member defining an annular metering chamber, and outer and inner annular seals operative between the respective outer and inner ends of the valve stem and the valve member to seal the metering chamber therebetween. The valve stem is hollow whereby in a non-dispensing position of the valve stem, the metering chamber is connected to the container and charged with product therefrom. The valve stem is movable against the action of a spring to a dispensing position wherein the metering chamber is isolated from the container and vented to atmosphere for the discharge of product.

A problem with this type of metering valve, especially with liquid propellant having a particulate product suspended therein, is the deposition of the solid product on the internal surfaces of the metering chamber and other components after a number of operation cycles and/or storage. This can lead to reduced efficiency of operation of the valve since deposition of the product reduces the amount of active drug available to be dispensed (due to the active drug remaining on the surfaces of the chamber). Prior art devices rely on the container and attached valve being shaken in an attempt to dislodge the deposited particles as a result of the movement of the liquid propellant and product mixture. However, whilst this remedy is effective within the body of the container itself, it is not effective for particles deposited on the inner surfaces of the metering chamber. As the size of the chamber is significantly smaller, the restricted flow of fluid in the metering chamber (caused by the tortuosity of the flow path through the chamber) means that the fluid in the metering chamber does not move with enough energy to adequately remove the deposited particles.

It is therefore an object of the present invention to provide a metering valve in which deposition of the product and active drug component on the walls of the metering chamber is minimised.

According to the present invention there is provided a metering valve for use with a pressurised dispensing container, the valve comprising a valve stem co-axially slidable within a valve member defining an annular metering chamber, outer and inner annular seals operative between the respective outer and inner ends of the valve member and the valve stem to seal the annular metering chamber therebetween, wherein the valve member comprises a main component part and a liner lining at least a portion of an inner surface of the main component part, wherein the liner is made of a fluoropolymer, or a material selected from the group consisting of stainless steel or aluminum, at least a portion of an inner surface of the liner having a coating of a fluoropolymer and the main component part is made of another material.

Preferably the liner is polytetrafluoroethylene.

Preferably the liner is formed as a separate component insertable within the main component part.

Alternatively the liner is formed as a co-moulding with the main component part.

Preferably the thickness in the radial direction of the liner is less than or equal to 0.6 mm.

In one embodiment the thickness in the radial direction of the liner is 0.5 mm.

Preferably the thickness in the radial direction of the polytetrafluoroethylene layer is less than 30 microns.

Particular embodiments of the present invention will now be described, by way of example only, with reference to the accompanying drawings, in which.

Figure 1:
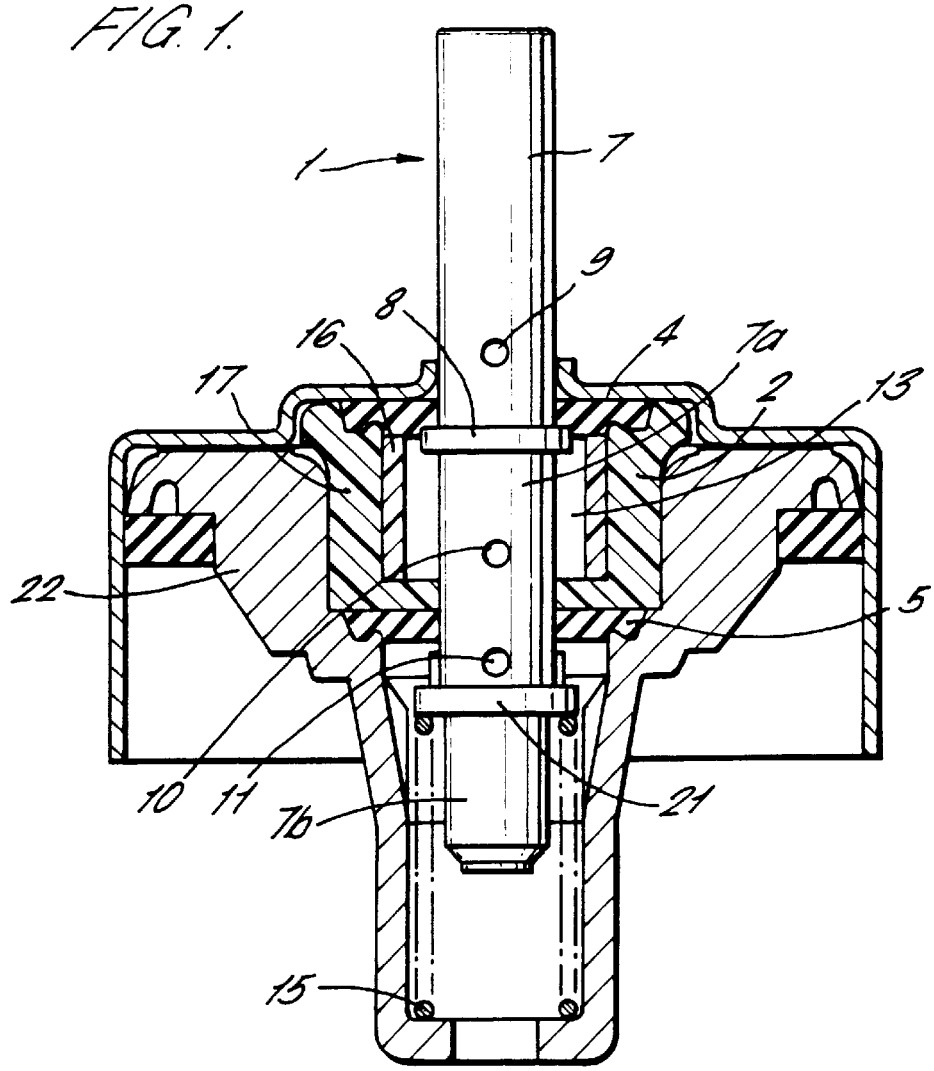
FIG. 1 is a cross-sectional view of a metering valve according to the present invention.

The metering valve of FIG. 1 includes a valve stem 1 which protrudes from and is axially slidable within a valve member 2 defining an annular metering chamber 13. The valve member 2 is located within a valve body 22 which is positioned in a pressurised container (not shown). The metering valve is held in position by means of a ferrule crimped to the top of the container.

An outer seal 4 and an inner seal 5 of elastomeric material extend radially between the valve stem 1 and the valve member 2. The outer seal 4 is radially compressed between the valve member 2 and the valve stem 1 so as to provide positive sealing contact, the compression being achieved by using a seal which provides an interference fit on the valve stem 1 and/or by the crimping of a ferrule onto the pressurised container during assembly.

The "upper end" 7 (i.e. the end which protrudes from the valve) of the valve stem 1 is a hollow tube which is closed at a flange 8, which flange 8 is located within the metering chamber 13. The valve stem 1 includes a discharge port 9 extending radially through the side wall of the valve stem 1 adjacent to the flange 8. Formed in an intermediate section 7a of the valve stem 1, which is also hollow, is a passage, comprising a pair of spaced radial ports 10 and 11 which are inter-connected through the central cavity.

A spring 15 extending between a second flange 21 located between and separating the intermediate section 7a and a lower section 7b of the valve stem 1, biases the valve stem 1 in a "non-dispensing" position in which the flange 8 is held in sealing contact with the outer seal 4. The second flange 21 is located outside the valve member 2, but within the valve body 22.

The metering chamber 13 is sealed from the atmosphere by the outer seal 4 and from the pressurised container (not shown) to which the valve is attached by the inner seal 5. In the illustration of the valve shown in FIG. 1, the radial ports 10 and 11 together with the central cavity connect the metering chamber 13 with the container so that in this condition the metering member 13 would be charged with product to be dispensed.

Upon depression of the upper end 7 of the valve stem 1 relative to the valve member 2 so that it moves inwardly into the container, the radial port 10 is closed off as it passes through the inner seal 5 so that the metering chamber 13 is isolated from the contents of the pressurised container. Upon further movement of the valve stem 1 in the same direction the discharge port 9 passes through the outer seal 4 into communication with the metering chamber 13. In this "dispensing" position the product in the metering chamber 13 is free to be discharged to the atmosphere via the discharge port 9 and the hollow upper end 7 of the valve stem 1.

When the valve stem 1 is released the biassing of the return spring 15 causes the valve stem 1 to return to its original position, the metering chamber 13 as a result becoming recharged in readiness for further dispensing operations.

Conventional valve members are formed as a single moulding from one material such as acetal, polyester or nylon which are prone to the deposition problems described above. It has been found in experiments that deposition of the active drug on the wall of a metering chamber made from a fluoropolymer such as PTFE, a ceramic or a glass is significantly reduced, compared to conventional valve member materials such as acetal, polyester or nylon.

However, a problem associated with utilising fluoropolymers in metering members is the fact that fluoropolymers tend to "swell" when exposed to the propellants used in such pressurised dispensing containers. This swelling can affect the metered volume of the metering chamber as the internal and external diameters of the valve member change uncontrollably. Hence, the dose size administered is also affected. This is a serious problem, especially where the product is a pharmaceutical drug requiring to be administered in accurately determined doses.

Figure 2:
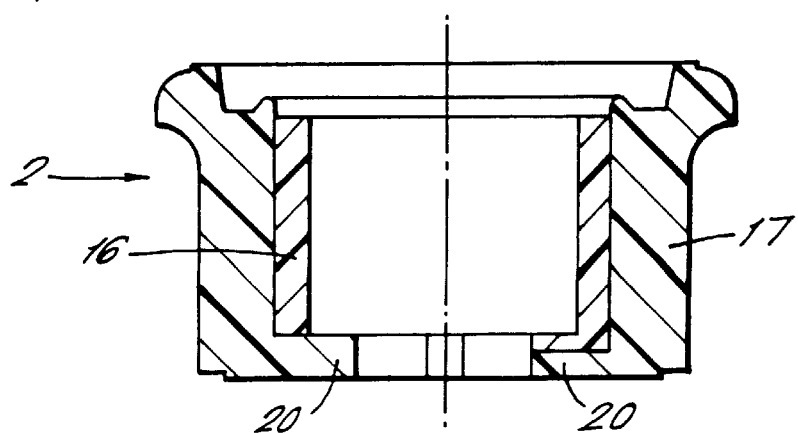
FIG. 2 is a cross-sectional view of the metering chamber of the metering valve of FIG. 1, showing two alternative versions of the inner liner on the right and left hand sides.

In the present invention the valve member 2, as shown in FIG. 2, comprises a main component part 17 and an inner annular liner 16 assembled or formed co-axially and in contact with one another. The main component part 17 is manufactured from a conventional material for such a component, for example acetal, polyester or nylon. In one embodiment the inner liner 16 is manufactured from a fluoropolymer such as polytetrafluoroethylene (PTFE) and lines the inner annular surface of the valve member 2 so that it effectively forms the wall of the metering chamber 13. Typical fluoropolymers of this type are the TEFLON (RTM) PFA fluorocarbon resins manufactured by Du Pont, Inc. The inner liner 16 is "thin-walled", having a typical thickness in the radial direction of between 10% and 30% of the total radial thickness of the valve member 2. In one example the thickness in the radial direction of the inner liner 16 is 0.5 mm and the thickness of the main component part 17 1.5 mm.

The left-hand and right-hand sides of FIG. 2 show two alternate versions of the inner liner 16. On the left-hand side the inner liner 16 extends axially along the length of the annular metering chamber 13. On the right-hand side the inner liner 16 additionally extends radially to cover a base 20 of the valve member 2, which lies adjacent the inner seal 5. The version shown on the right-hand side of FIG. 2 has the advantage that deposition of the active drug on the base 20 of the valve member 2 is minimised.

The problem associated with the utilisation of fluoropolymers is overcome in the present invention by limiting the use of the PTFE or other fluoropolymer to only the liner 16. The thin-walled nature of the liner 16 results in the degree of swelling of the PTFE being reduced to the extent that variation of the metered volume is insignificant. A further advantage of using PTFE in only the liner 16 is that the volume of PTFE required to manufacture each metering valve is reduced significantly compared to a valve member 2 wholly manufactured from PTFE. This is advantageous since PTFE is expensive compared to the conventional metering valve member materials of acetal, polyester and nylon.

The fluoropolymer liner 16 may be manufactured as a separate moulding insertable within the main component part 17 of the metering valve 2. Alternatively, the main component part 17 and fluoropolymer liner 16 may be moulded together as a single component, the moulding process involving two steps. The first step comprising the moulding of the liner 16 from PTFE and the second step comprising inserting the liner 16 into a second mould and injecting the main component part material, for example polyester, into the mould to form the main component part 17 surrounding the liner 16.

Alternatively the liner 16 of PTFE may be applied to the main component part 17 as a coating by means of spraying, dipping or any other suitable coating mechanism.

Figure 3:
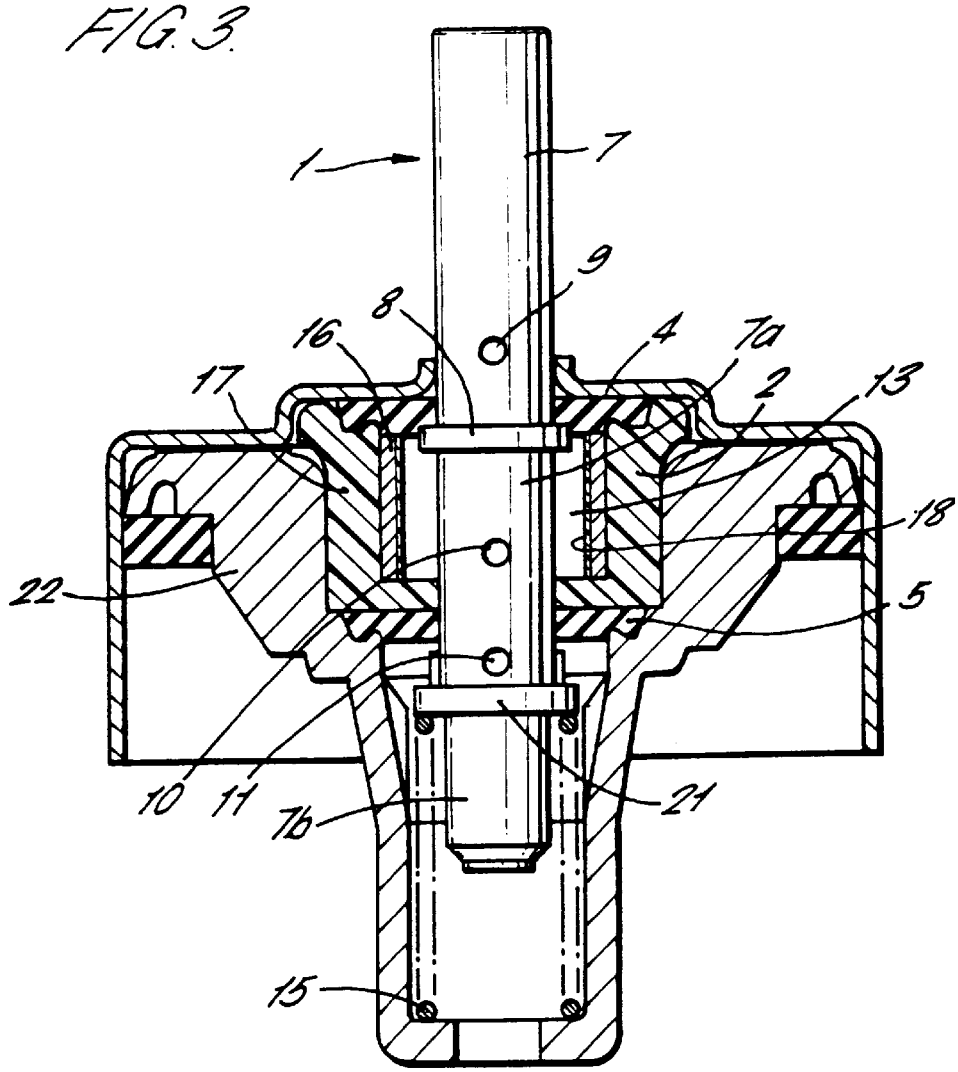
FIG. 3 is a cross-sectional view of another embodiment of metering valve according to the present invention.
Figure 4:
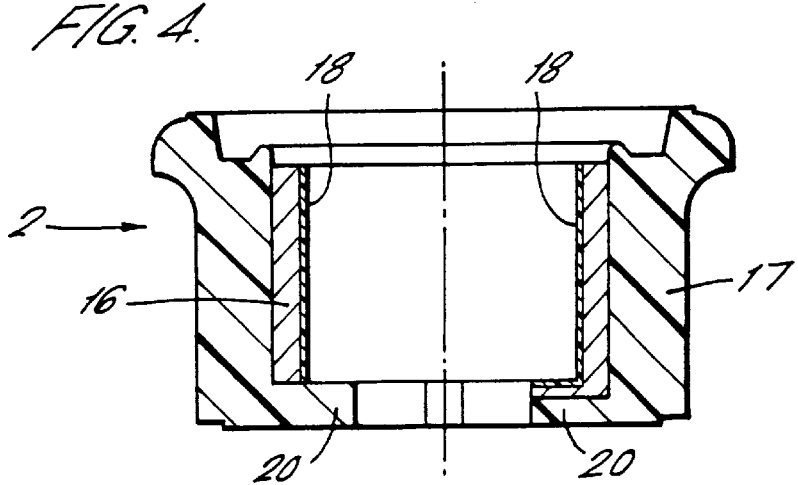
FIG. 4 is a cross-sectional view of the metering chamber of the metering valve of FIG. 3, showing two alternative versions of the inner liner on the right and left hand sides.

Another embodiment of the present invention is shown in FIGS. 3 and 4. As in the embodiment described above the valve member 2, as shown in FIG. 3, comprises a main component part 17 and an inner annular liner 16 assembled or formed co-axially and in contact with one another. The main component part 17 is manufactured from a conventional material for such a component, for example acetal, polyester or nylon. In this embodiment, however, the inner liner 16 is manufactured from a metal such as aluminium or stainless steel and lines the inner annular surface of the valve member 2 so that it effectively forms the wall of the metering chamber 13. An inner surface of the liner 16 is coated with a layer 18 of a fluoropolymer such as those described above. The inner liner 16 has a typical thickness in the radial direction of between 10% and 30% of the total radial thickness of the valve member 2. In one example the thickness in the radial direction of the inner liner 16 is between 0.3 mm and 0.5 mm and the thickness of the main component part 17 1.5 mm. The thickness of the PTFE layer 18 in the radial direction is very thin, typically no more than 30 microns.

The left-hand and right-hand sides of FIG. 4 show two alternate versions of the inner liner 16. On the left-hand side the inner liner 16 extends axially along the length of the annular metering chamber 13. On the right-hand side the inner liner 16 additionally extends radially to cover a base 20 of the valve member 2, which lies adjacent the inner seal 5. The layer 18 is applied to the inner surface of both the radial and axial portions of the liner 16. The version shown on the right-hand side of FIG. 4 has the advantage that deposition of the active drug on the base 20 of the valve member 2 is minimised.

The problem associated with the utilisation of fluoropolymers is overcome in this embodiment by limiting the use of the PTFE or other fluoropolymer to only the thin layer 18. The thin nature of the layer 18 results in the degree of swelling of the PTFE being reduced to such an extent that variation of the metered volume is insignificant. A further advantage of using PTFE in only the layer 18 is that the volume of PTFE required to manufacture each metering valve is reduced significantly compared to a valve member 2 or liner wholly manufactured from PTFE. This is advantageous since PTFE is expensive compared to the conventional metering valve member materials of acetal, polyester and nylon.

The annular liner 16 is preferably manufactured as a separate component insertable within the main component part 17 of the metering valve 2. Preferably the liner 16 is a 'push-fit' in the main component part 17 such that the liner 16 is positively retained in the main component part 17. Alternatively, the main component part 17 may be moulded around the annular liner 16. The liner 16 is inserted into a mould and the main component part material, for example polyester, is injected into the mould to form the main component part 17 surrounding the liner 16.

The PTFE layer 18 is applied to the inner surface of the annular liner 16 by any suitable method, for example spraying or dipping. The liner 16 may be coated before or after insertion in the main component part 17.

The present invention has particular application to pharmaceutical metering valves. Whilst the invention has been described with reference to PTFE, and to a particular type of valve member, it will be apparent that the liner 16 could be manufactured from any fluoropolymer and inserted/utilised in other types of valve member without departing from the scope of the present invention.

What is claimed is:

1. A metering valve for use with a pressurised dispensing container, containing a product for dispensation, the valve comprising a valve stem coaxially slidable within a valve member defining an annular metering chamber, outer and inner annular seals operative between the respective outer and inner ends of the valve member and the valve stem to seal the annular metering chamber therebetween, wherein the valve member comprises a main component part and a liner lining at least a portion of an inner surface of the main component part, the liner defining at least a portion of an inner surface of the metering chamber, wherein the liner is made of a fluoropolymer or a material selected from the group consisting of stainless steel or aluminum, at least a portion of an inner surface of the liner having a coating of a fluoropolymer, and the main component part is made of another material such that, in use, deposition of the product on the inner surface of the metering chamber is reduced.

2. A metering valve as claimed in claim 1, wherein the liner is polytetrafluoroethylene.

3. A metering valve as claimed in claim 1, wherein the liner is formed as a separate component insertable within the main component part.

4. A metering valve as claimed in claim 1, wherein the liner is formed as a co-moulding with the main component part.

5. A metering valve as claimed in claim 1 wherein the thickness in the radial direction of the liner is less than or equal to 0.6 mm.

6. A metering valve as claimed in claim 1 wherein the thickness in the radial direction of the liner is 0.5 mm.

7. A metering valve as claimed in claim 1, wherein the thickness in the radial direction of the fluoropolymer layer is less than 30 microns.

* * * * *